United States Patent [19]

Shibata et al.

[11] Patent Number: 5,532,866
[45] Date of Patent: Jul. 2, 1996

[54] POLYGONAL MIRROR AND MANUFACTURING METHOD THEREOF AND LIGHT BEAM SCANNING OPTICAL APPARATUS USING THE POLYGONAL MIRROR

[75] Inventors: Etsuko Shibata, Toyohashi; Hiromu Nakamura, Toyokawa, both of Japan

[73] Assignee: Minolta Camera Kabushiki Kaisha, Osaka, Japan

[21] Appl. No.: 224,507

[22] Filed: Apr. 7, 1994

[30] Foreign Application Priority Data

Apr. 8, 1993 [JP] Japan .................. 5-082240

[51] Int. Cl.⁶ .................................................. G02B 26/08
[52] U.S. Cl. ......................................... 359/216; 206/219
[58] Field of Search ..................... 359/205, 206, 359/208, 212, 216–219, 850, 868, 869, 662; 250/234–236; 347/256–261; 358/474, 296, 302

[56] References Cited

U.S. PATENT DOCUMENTS

| | | | |
|---|---|---|---|
| 4,758,059 | 7/1988 | Sakuma | 359/217 |
| 5,038,156 | 8/1991 | Kuroda | 346/108 |
| 5,083,138 | 1/1992 | Nowak et al. | 347/261 |

FOREIGN PATENT DOCUMENTS

| | | |
|---|---|---|
| 52-49851 | 4/1977 | Japan . |
| 59-102211 | 6/1984 | Japan . |
| 59-113409 | 6/1984 | Japan . |
| 62-119514 | 5/1987 | Japan . |
| 64-20518 | 1/1989 | Japan . |

*Primary Examiner*—James Phan
*Attorney, Agent, or Firm*—Price, Gess & Ubell

[57] ABSTRACT

A light beam scanning optical apparatus which deflects a light beam emitted from a light source with a polygonal mirror and scans the light beam on a photosensitive member through an fθ optical system. Suppose the distance between a rotation axis of the polygonal mirror and each reflecting facet in a case wherein the reflecting facets are flat to be A. If a convergent light beam is incident to the polygonal mirror, and if the reflecting facets are concave, the distance between the rotation axis and the facets is adjusted to be larger than A. If the reflecting facets are convex, the distance is adjusted to be smaller than A. Also, if a divergent light beam is incident, and if the reflecting facets are concave, the distance between is adjusted to be smaller than A. If the reflecting facets are convex, the distance is adjusted to be larger than A.

5 Claims, 5 Drawing Sheets

CONVERGENT LIGHT/
CONCAVE FACET

CONVERGENT LIGHT/
CONVEX FACET

DIVERGENT LIGHT/
CONCAVE FACET

DIVERGENT LIGHT/
CONVEX FACET

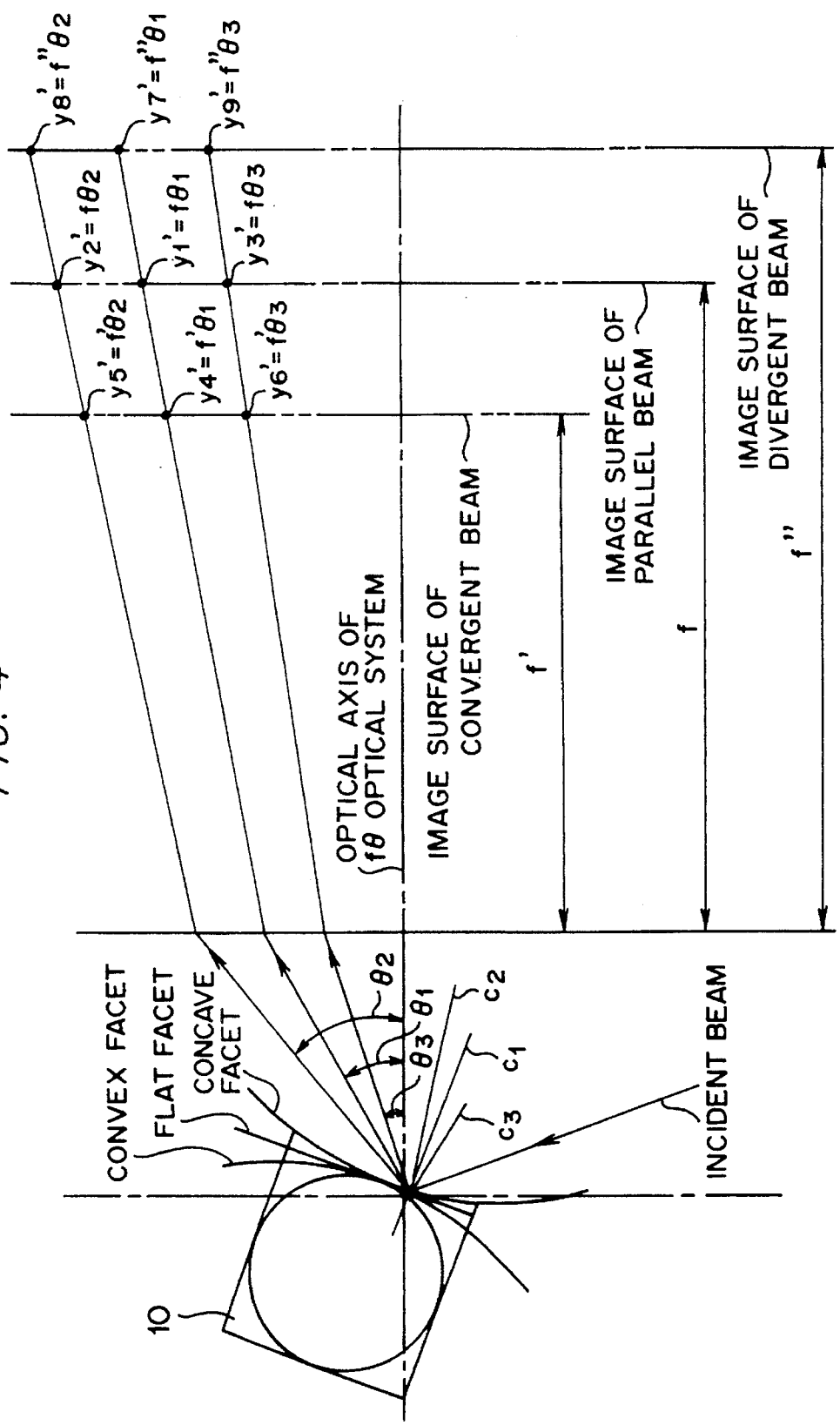

POLYGONAL MIRROR AND MANUFACTURING METHOD THEREOF AND LIGHT BEAM SCANNING OPTICAL APPARATUS USING THE POLYGONAL MIRROR

BACKGROUND OF THE INVENTION

1. Field of the invention

The present invention relates to a light beam scanning optical apparatus, and more particularly to a light beam scanning optical apparatus which is used as an image writing head or an image reading head of an image forming apparatus such as an elecrophotographic copying machine, a laser printer and a facsimile.

2. Description of Related Art

Conventionally, as a light beam scanning optical apparatus which is used in a printer and an image reader, a type which is provided with a polygonal mirror is well-known. The polygonal mirror is a polyhedron which has a plurality of reflecting facets at its periphery. The polygonal mirror rotates at a constant velocity driven by a motor, and deflects a light beam which is emitted from a light source with each reflecting facet to scan the light beam at a constant angular velocity. The deflected light beam is then imaged on a light receiving surface through an fθ optical system.

Required performances of each reflecting facet are (1) flatness, (2) alignment from a center of the polygonal mirror and (3) perpendicularity. The alignment from the center of the polygonal mirror affects the accuracy of a printing start position. However, this can be amended by using what is called an SOS signal which is generated based on detection of the deflected light beam. The perpendicularity affects the accuracy of a printing pitch of each line. Moreover, this also can be amended by having an optical element with an amending function. Inaccuracy in the flatness causes a jitter, and there has been no optical means to amend this jitter. Thus, flatness is especially required of each reflecting facet of the polygonal mirror. Particularly, in recent years, the polygonal mirror has been produced from resin for a lighter weight, mass production and cost reduction. However, it is very difficult to finish off each reflecting facet flat with high accuracy in a resin molding process, and this causes lowering of productivity, and more specifically, causes more defects and takes a longer molding process time.

SUMMARY OF THE INVENTION

An object of the present invention is to provide a polygonal mirror which can decrease a jitter without using optical means even though the reflecting facets of the polygonal mirror are not flat, and a manufacturing method thereof.

That the reflecting facets of the polygonal mirror are not flat means that the reflecting facets are concave or convex. In the present invention, a set value A for an axis-to-facet distance is adjusted in accordance with the form of the incident light beam which enters the fθ optical system and the shape of the reflecting facets of the polygonal mirror. The axis-to-facet distance means the distance between the rotation axis of the polygonal mirror and each reflecting facet. A reflecting facet which is finished to be flat with a high accuracy within a tolerance is referred to as a flat reflecting facet, and the set value A means the distance between the rotation axis of the polygonal mirror and its flat reflecting facet.

The adjustment of the set value A is carried out as follows: (a) if the incident light is a convergent light beam, and if the reflecting facets are concave, the set value A is increased; (b) if the incident light is a convergent light beam, and if the reflecting facets are convex, the set value A is decreased; (c) if the incident light is a divergent light beam, and if the reflecting facets are concave, the set value A is decreased; and (d) if the incident light is a divergent light beam, and if the reflecting facets are convex, the set value A is increased.

As for relationship between the axis-to-facet distance and an image height on a light receiving surface, if the incident light beam is a parallel light, the image height is fixed regardless of a change of the axis-to-facet distance. On the other hand, if the light beam is a convergent or a divergent light beam, the image height is shifted inside or outside in the main scanning direction with a change of the axis-to-facet distance. The present invention uses this character. If the reflecting facets of the polygonal mirror have an error in the flatness (have a concave or convex curvature), a shift of the image height which is caused by the curvature is counterbalanced by a shift of the image height which is caused by the change of the axis-to-facet distance. Thereby, the jitter is decreased.

For example, if the incident light which enters the fθ optical system is a convergent light beam, and if the reflecting facets are concave, the image height is shifted outside in the main scanning direction compared with the one when the reflecting facets are flat. In this case, the axis-to-facet distance is set larger than the one when the reflecting facets are flat in order to shift the image height inside. Thereby, the image height becomes the same as the image height when the reflecting facets are flat, and the jitter problem is solved.

Further, a manufacturing method of the polygonal mirror according to the present invention includes a process for producing a polyhedron with resin by injection molding, a process for measuring an error in the flatness of each facet of the molded polyhedron and a process for adjusting the axis-to-facet distance of the polyhedron according to the measured error in the flatness.

BRIEF DESCRIPTION OF THE DRAWINGS

These and other objects and features of the present invention will become apparent from the following description with reference to the accompanying drawings, in which:

FIG. 4 is a chart which shows variations in the image height of an fθ optical system according to differences in the shape of the reflecting facets of the polygonal mirror.

DETAILED DESCRIPTION OF THE PREFERRED EMBODIMENTS

The description of preferred embodiments according to the present invention is given below, referring to the accompanying drawings.

Figure 1:
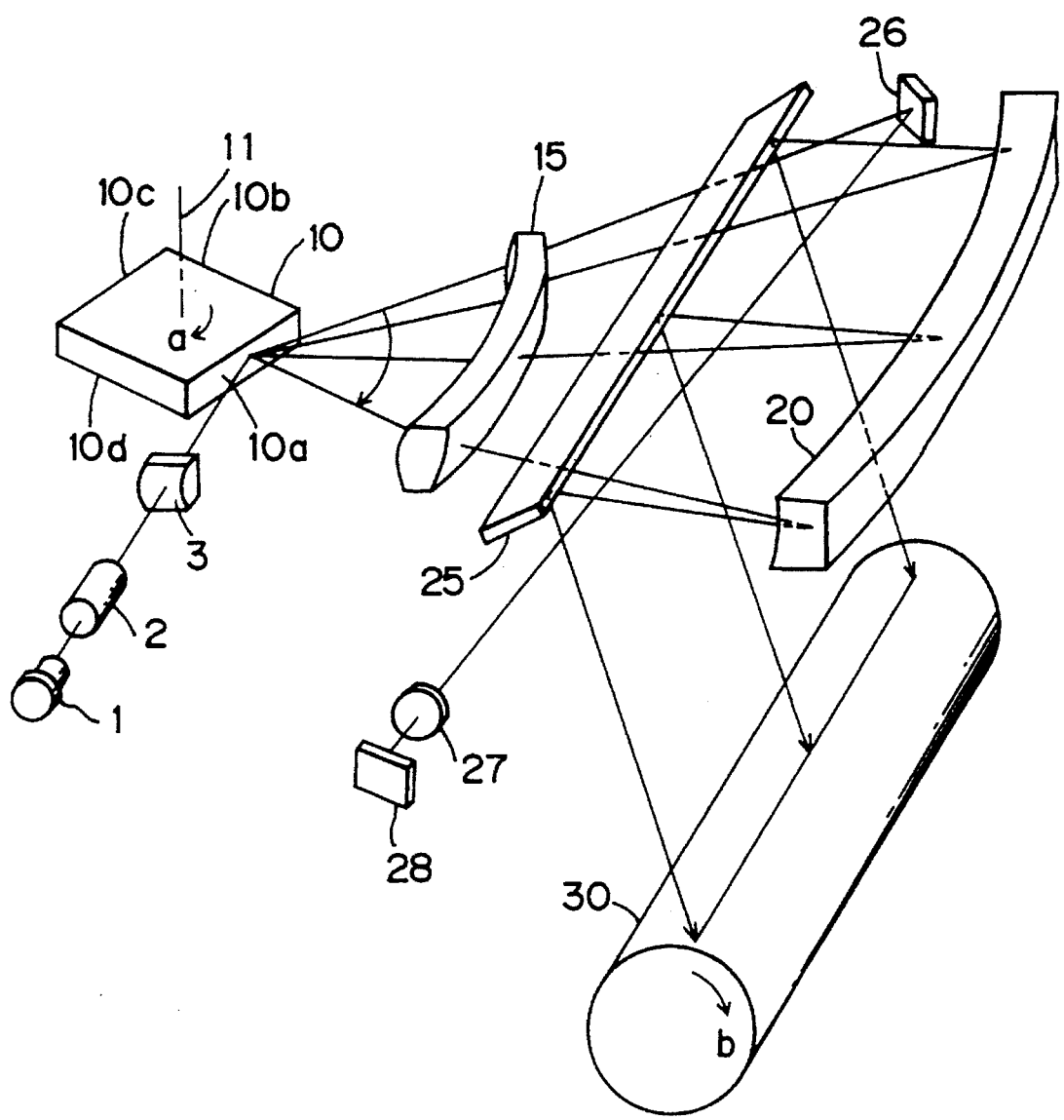
FIG. 1 is a perspective view which shows a light beam scanning optical apparatus which is an embodiment of the present invention.

FIG. 1 shows a light beam scanning optical apparatus which is applied with the present invention. Numeral 1 denotes a laser diode, 2 denotes a collimator lens, 3 denotes a cylindrical lens, 10 denotes a polygonal mirror, 15 denotes a toric lens, 20 denotes a spherical mirror, 25 denotes a plane mirror and 30 denotes a photosensitive drum.

The laser diode 1 is modulated (turned on and off) by a controlling circuit (not shown) and emits a divergent light beam in accordance with image data. This divergent light beam is collimated to be a specified divergent light beam, a convergent light beam or a parallel light beam while passing through the collimator lens. This light beam further passes through the cylindrical lens 3, and is incident to reflecting facets of the polygonal mirror 10 in a linear form extending in a plane of deflection, that is, in the main scanning direction. The polygonal mirror 10 is driven by a motor (not shown) to rotate at a constant speed in a direction indicated with an arrow a having a shaft 11 as the axis. Thus, a light beam which is emerged from the cylindrical lens 3 is reflected by the reflecting facets of the polygonal mirror 10 continuously and is scanned at a constant angular velocity. The light beam passes through the toric lens 15, and is reflected by the concave side of the spherical mirror 20. Then the light beam is reflected by the plane mirror 25 and imaged on the photosensitive drum 30. At that time, the light beam is scanned at a constant speed in the direction of an axis of the photosensitive drum 30. This is called main scanning. Also, the photosensitive drum 30 is driven to rotate at a constant speed in a direction which is indicated with an arrow b. Scanning by this rotation is called sub scanning.

A mirror 26 is located close to a beginning point of scanning in the main scanning direction, and reflects the light beam which is reflected by the polygonal mirror 10 to a sensor 28 through a convergent lens 27. According to a light detecting signal from the sensor 28, a print starting position of each scanning line on the photosensitive drum 30 is decided. (Thereby, an error in alignment of the facets from the center of the polygonal mirror is corrected).

The toric lens 15 has a meniscus shape in the main scanning direction, and has a positive power. More specifically, either an incidence side or an emergence side of the toric lens 15 is a toroidal surface, and the other side is either a spherical surface or a cylindrical surface. The toroidal surface means a surface whose two principal meridians have different centers of curvature.

In the light beam scanning optical apparatus of the above structure, an image (an electrostatic latent image) is formed on the photosensitive drum 30 by the modulation of the laser diode 1, the main scanning and the sub scanning. Also, the spherical mirror 20 and the toric lens 15 prevents distortion such that a scanning speed in the main scanning direction will be equal from the center to the both ends of scanning area, and also prevents a curvature of field in the main scanning direction on the photosensitive drum 30.

Also, the toroidal surface of the toric lens 15 corrects an error in the perpendicularity of the reflective facets of the polygonal mirror 10, and at the same time, prevents curvature of field in the sub scanning direction on the photosensitive drum 30. If there is an error in mutual perpendicularity of the reflecting facets of the polygonal mirror 10, scanning lines are misaligned in the sub scanning direction on the photosensitive drum 30, and the pitch of the image becomes irregular. This error in perpendicularity of the reflecting facets can be corrected by setting each reflecting facet of the polygonal mirror 10 and a light receiving surface of the photosensitive drum 80 to be conjugate. In the present optical apparatus, while the light beam is converged onto the polygonal mirror 10 by the cylindrical lens 3, the conjugate relationship between each reflecting facet and the light receiving surface is kept by the toroidal surface of the toric lens 15. The spherical surface of the toric lens 15 mainly corrects the curvature of field in the main scanning direction and, additionally prevents the distortion.

Figure 2A:
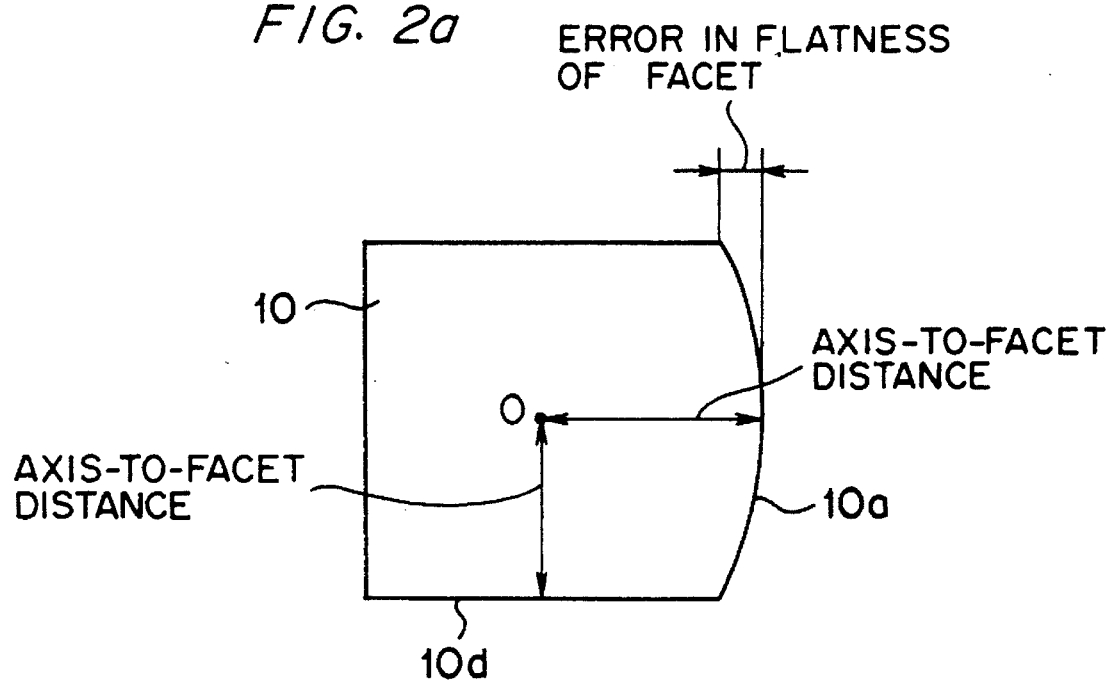
FIGS. 2a and 2b are views which explain errors in flatness of reflecting facets of a polygonal mirror and an axis-to-facet distance in each case.
Figure 2B:
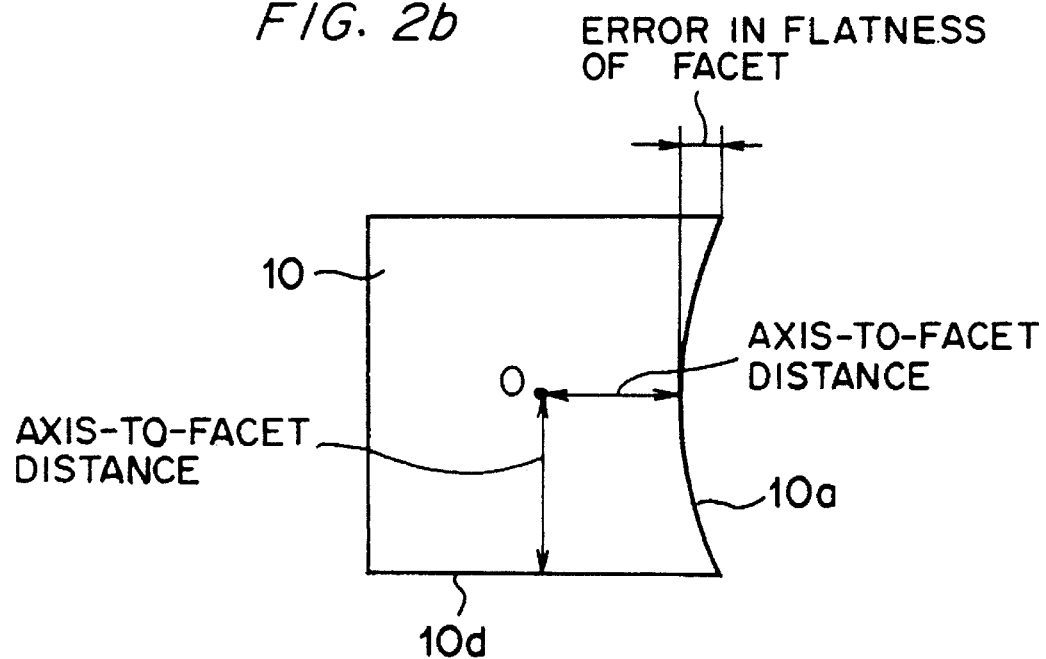

As for the polygonal mirror 10, an error in the flatness of the reflecting facets 10a, 10b, 10c and 10d has to be kept within an absolute value of $\lambda/4$ ($\lambda$:wave length of a light beam, $630 \times 10^{-6}$ mm). If an error in the flatness of the reflecting facets is larger than $\lambda/4$, the image height in the main scanning direction is shifted largely in the main scanning direction. As a result, the jitter on the photosensitive drum 30 becomes larger, and this deteriorates the quality of the image. The error in the flatness of the reflecting facets indicates, as shown in FIGS. 2a and 2b, the distance in a direction of normal of a reflecting facet 10a between the top and an end of the curve of the facet 10a. The error in the flatness of flat reflecting facet (for example, the reflecting facet 10d) is zero.

On the other hand, as for the axis-to-facet distance (distance between the center of rotation O and each reflecting facet) of the polygonal mirror 10, a misalignment within an absolute value of 1/100 mm is allowable. Although the axis-to-facet distance is different from the designed value in such a degree and thereby a beam waist is shifted (although an image surface is shifted), since this shift is within a depth of focus of the f$\theta$ optical system, the focus is not out and seldom affects the image.

The influence of an error in the flatness of the reflecting facets over the f$\theta$ system will be explained below (refer to FIG. 4).

First, a case wherein a parallel light beam is incident to a flat reflecting facet (an error in the flatness of the facet is zero) is studied. Supposing that the light beam reflected by the flat facet is incident to the f$\theta$ system which has a focal distance of f at an incident angle of $\theta_1$, the image height $y_1'$ is $f\theta_1$. Next, a case wherein a parallel light beam is incident to a concave reflecting facet is studied. The normal $c_2$ of the concave reflecting facet at the beam incidence point inclines inside compared with the normal $c_1$ in the case wherein the reflecting facet is flat. Thereby, in this case, the angle which is formed by the incident beam to the reflecting facet and the emergent beam therefrom is increased. Supposing that the emergent beam from the concave reflecting facet is incident to the f$\theta$ system at an angle of $\theta_2$, the image height $y_2'$ is $f\theta_2$. Further, a case wherein a parallel light beam is incident to a convex reflecting facet is studied. The normal $c_3$ of the convex reflecting facet at the beam incidence point inclines outside compared with the normal $c_1$. Thereby, in this case, the angle which is formed by the incident beam to the reflecting facet and the emergent beam therefrom is decreased. Supposing that the beam emergent from the convex reflecting facet is incident to the f$\theta$ system at an angle of $\theta_3$, the image height $y_3'$ is $f\theta_3$.

In a case wherein a convergent light beam is incident to a reflecting facet, whether the facet is flat, concave or convex, the image surface is shifted in a minus direction, and a shift of the image height occurs according to the shape of the reflecting facet in the same manner as described above. Thus, the image height in the case of a convergent light beam is shifted to $y_4'$, $y_5'$ and $y_6'$ when the facet is flat, concave and convex respectively.

In a case wherein a divergent light beam is incident to a reflecting facet, whether the facet is flat, concave or convex, the image surface is shifted in a plus direction, and a shift of the image height occurs according to the shape of the reflecting facet in the same manner as described above. Thus, the image height in the case of a divergent light beam is shifted to $y_7'$, $y_8'$ and $y_9'$ when the facet is flat, concave and convex respectively.

Table 1 classifies shifts of the image height illustrated by FIG. 4 according to the shape of the reflecting facet and the form of the light beam.

TABLE 1

|  | convergent light | parallel light | divergent light |
|---|---|---|---|
| flat reflecting facet | image height $y_4' = f\theta_1$ | image height $y_1' = f\theta_1$ | image height $y_7' = f''\theta_1$ |
| concave reflecting facet | image height $y_5' = f\theta_2$ shifted outside than that in a case of flat facet | image height $y_2' = f\theta_2$ shifted outside than that in a case of flat facet | image height $y_8' = f''\theta_2$ shifted outside than that in a case of flat facet |
| convex reflecting facet | image height $y_6' = f\theta_3$ shifted inside than that in a case of flat facet | image height $y_3' = f\theta_3$ shifted inside than that in a case of flat facet | image height $y_9' = f''\theta_3$ shifted inside than that in a case of flat facet |

Next, the influence of a change of the axis-to-facet distance over the fθ system is explained below (refer to FIG. 5).

First, a case wherein a parallel light beam is incident to a flat reflecting facet is studied. The designed axis-to-facet distance is A, and the image height in this case is $y_{11}'$. If the axis-to-facet distance becomes smaller by Δd, the reflecting point on the facet is moved, and the reflected light beam is incident to the fθ system at an outside point. However, the incident angle $\theta_1$ is not changed, and thus, the image height is still $y_{11}'$. On the other hand, if the axis-to-facet distance becomes larger by Δd, the reflecting point on the facet is moved, and the reflected light beam is incident to the fθ system at an inside point. However, also in this case, the incident angle $\theta_1$ is not changed, and thus, the image height is not shifted either.

However, when a convergent or a divergent light beam is incident to the fθ system, if the axis-to-facet distance is changed, the image height is shifted inside or outside. When a convergent light beam is incident to a flat reflecting facet, if the axis-to-facet distance is A, the image height is $y_{12}'$. If the axis-to-facet distance becomes smaller by Δd, the reflecting point is moved, and the reflected light beam is incident to the fθ system at an outside point. Although the incident angle $\theta_1$ is not changed, the image height is shifted outside to $y_{14}'$. On the other hand, if the axis-to-facet distance become larger by Δd, the reflecting point is moved, the reflected light beam is incident to the fθ system at an inside point. Although the incident angle $\theta_1$ is not changed, the image height is shifted inside to $y_{13}'$.

Further, when a divergent light beam is incident to a flat reflecting facet, if the axis-to-facet distance is the designed value A, the image height is $y_{15}'$. If the distance becomes smaller by Δd, the reflecting point on the facet is moved, and the reflected light beam is incident to the fθ system at an outside point. Although the incident angle $\theta_1$ is not changed, the image height is shifted inside to $y_{16}'$. On the other hand, if the axis-to-facet distance becomes larger by Δd, the reflecting point on the facet is moved, and the reflected light beam is incident to the fθ system at an inside point. Although the incident angle $\theta_1$ is not changed, the image height is shifted outside to $y_{17}'$.

Figure 5:
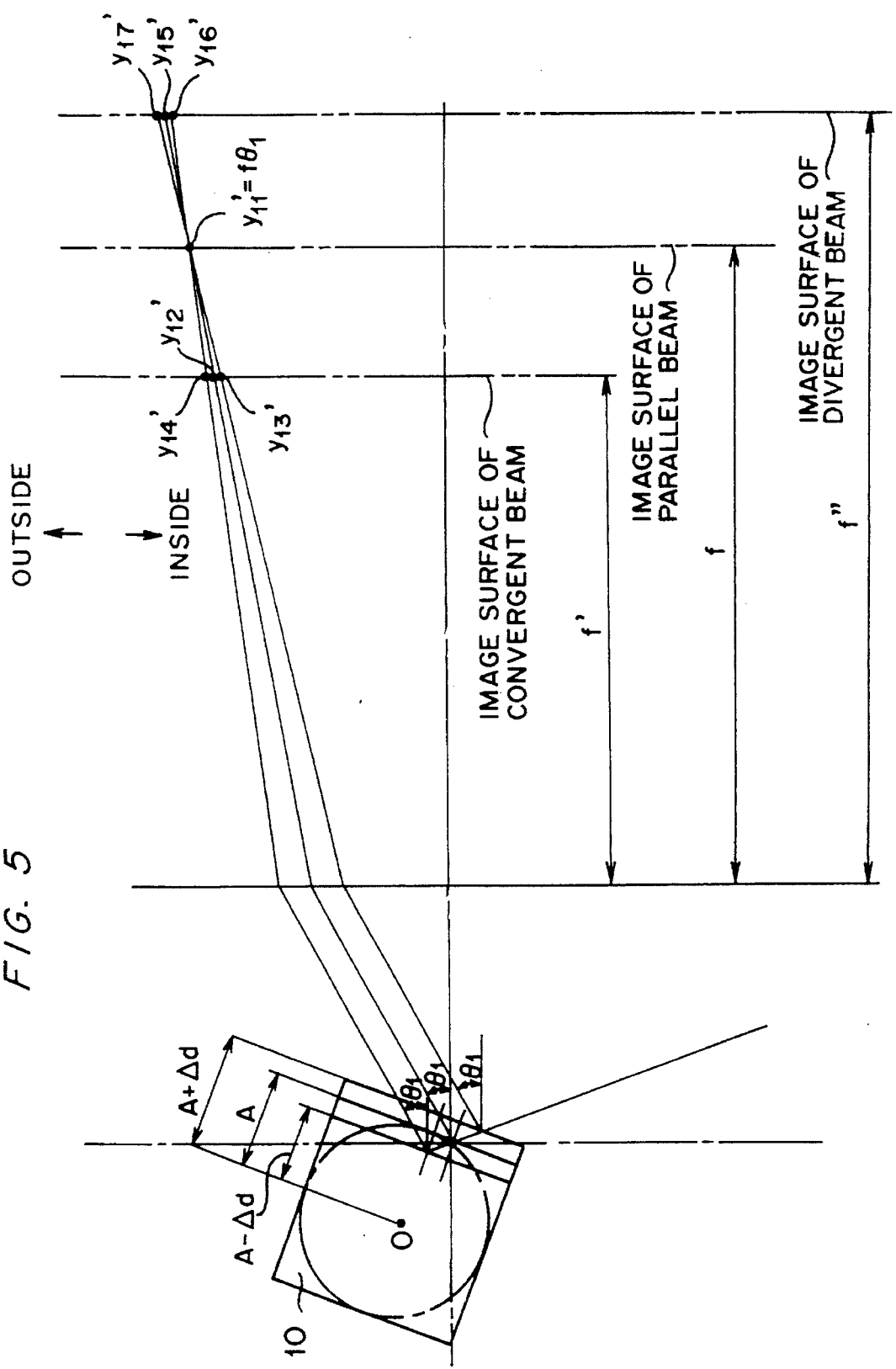
FIG. 5 is a chart which shows variations in the image height of an fθ optical system according to changes in the axis-to-facet distance of the polygonal mirror.

Table 2 classifies shifts of the image height illustrated in FIG. 5 according to the axis-to-facet distance and the form of the light beam.

TABLE 2

|  | convergent light | parallel light | divergent light |
|---|---|---|---|
| axis-to-facet distance = A − Δd | image height $y_{14}'$ shifted outside | image height $y_{11}' = f\theta_1$ constant | image height y16' shifted inside |
| axis-to-facet distance = A | image height $y_{12}' = f\theta_1$ | image height $y_{11}' = f''\theta_1$ | image height $y_{15}' = f''\theta_1$ |
| axis-to-facet distance = A + Δ | image height $y_{13}'$ shifted inside | image height $y_{11}' = f''\theta_1$ constant | image height $y_{17}'$ shifted outside |

As explained above, when a parallel light beam is incident to the fθ system, the image height is constant regardless of changes of the axis-to-facet distance. On the other hand, when a convergent light beam or a divergent light beam is incident to the fθ system, the image height is shifted inside or outside with changes of the axis-to-facet distance. The present invention uses such a phenomenon. If the polygonal mirror has an error in the flatness of the reflecting facets, that is, if the reflecting facets have a curvature, a shift of the image height caused by this curvature is counterbalanced by a shift of the image height caused by the change of the axis-to-facet distance.

Figure 3A:
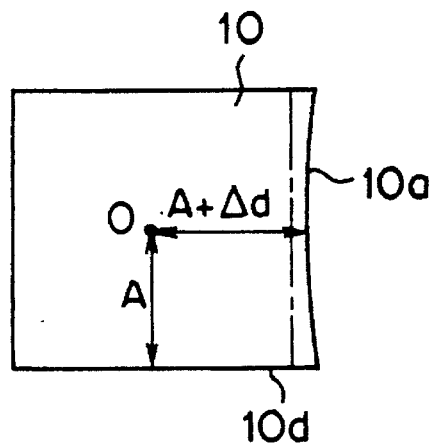
FIGS. 3a, 3b, 3c and 3d are views which explain how to adjust the set value for the axis-to-facet distance of a polygonal mirror.

As shown in FIG. 3a, when a convergent light beam is incident to a concave reflecting facet 10a, the image height is shifted outside compared with the image height which is reflected by a flat reflecting facet 10d. In order to correct it, the axis-to-facet distance A becomes larger by Δd. Thereby, the image height which is reflected by the facet 10a is shifted inside, and becomes almost the same as the one which is reflected by the facet 10d.

Figure 3B:
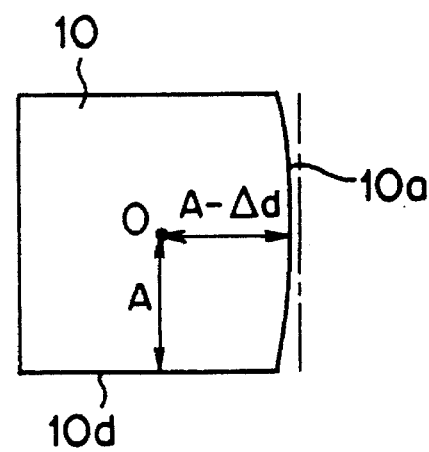

As shown in FIG. 3b, when a convergent light beam is incident to a convex reflecting facet 10a, the image height is shifted inside compared with the image height which is reflected by the flat reflecting facet 10d. In order to correct it, the axis-to-facet distance A becomes smaller by Δd compared to the axis-to-facet distance A. Thereby, the image height which is reflected by the facet 10a is shifted outside, and becomes almost the same as the one which is reflected by the facet 10d.

Figure 3C:
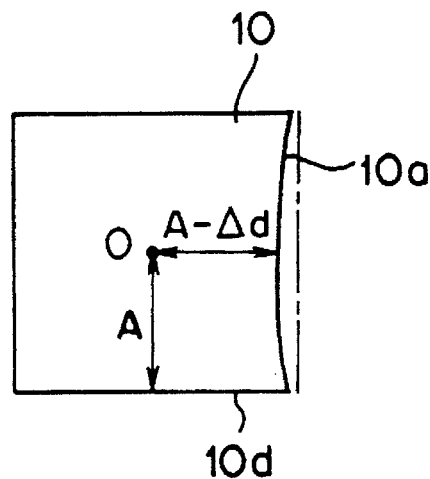

As shown in FIG. 3c, when a divergent light beam is incident to a concave reflecting facet 10a, the image height is shifted outside compared with the image height which is reflected by the flat reflecting facet 10d. In order to correct it, the axis-to-facet distance A becomes smaller by Δd. Thereby, the image height which is reflected by the facet 10a is shifted inside and becomes almost the same as the one which is reflected by the facet 10d.

Figure 3D:
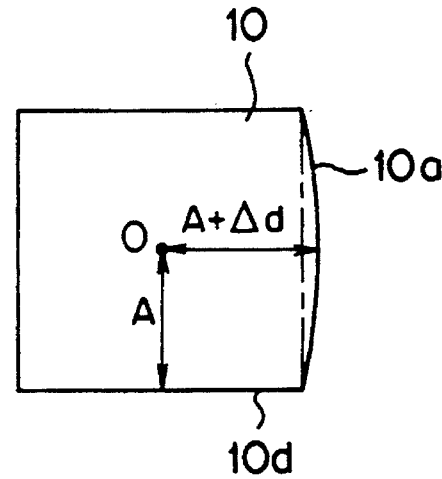

As shown in FIG. 3d, when a divergent light beam is incident to a convex reflecting facet 10a, the image height is shifted inside compared with the image height which is reflected by the flat reflecting facet 10d. In order to correct, the axis-to-facet distance A becomes larger by Δd. Thereby, the image height which is reflected by the facet 10a is shifted outside and becomes almost the same as the one which is reflected by the facet 10d.

Table 3 shows the adjustment of the axis-to-facet distance, which is illustrated by FIGS. 3a, 3b, 3c and 3d, according to the form of the light beam and the shape of the reflecting facet.

TABLE 3

|  | convergent light | divergent light |
| --- | --- | --- |
| concave reflecting facet | axis-to-facet distance = A + Δd | axis-to-facet distance = A − Δd |
| flat reflecting facet | axis-to-facet distance = A | axis-to-facet distance = A |
| convex reflecting facet | axis-to-facet distance = A − Δd | axis-to-facet distance = A + Δd |

The correction value Δd of the axis-to-facet distance is determined according to the curvature of the reflecting facet. For example, when a convergent light beam is incident to a concave reflecting facet, the larger the curvature is (the smaller the radius of curvature is), the larger the correction value Δd needs to be.

In this embodiment, the polygonal mirror 10 has four reflecting facets and is manufactured by injection molding using resin. First, a mold is so made that the axis-to-facet distance is supposed to be A, and a polygonal mirror 10 is produced by use of the mold. Then, an error in the flatness of each reflecting facet of the polygonal mirror 10 is measured. Then, the correction value Δd is decided according to the error in the flatness (curvature) of each reflecting facet and the shape of the light beam (convergent or divergent), and the mold is remade such that the axis-to-facet distance can be adjusted by Δd.

Next, exemplary composition of the light beam scanning optical apparatus which is shown in FIG. 1 is described using definite values.

First example of the composition

Table 4 shows a first example of the composition of the light beam scanning optical apparatus which is shown in FIG. 1.

TABLE 4

|  |  | radius of curvature (mm) | | space (mm) | refractive index |
| --- | --- | --- | --- | --- | --- |
|  |  | main scanning direction | sub scanning direction |  |  |
| polygonal mirror |  | infinity (reflecting facet) | | | |
| fθ optical | toric lens | −50.962 −54.561 | 29.25 | 40 8 | 1.0 1.48457 |

TABLE 4-continued

|  |  | radius of curvature (mm) | | space (mm) | refractive index |
| --- | --- | --- | --- | --- | --- |
|  |  | main scanning direction | sub scanning direction |  |  |
| system | spherical mirror | −480 (reflecting facet) | | 95 | 1.0 |
| image surface |  |  |  | 165 | 1.0 |

Table 5 shows shifts of the image height with errors in the flatness of the reflecting facets of the polygonal mirror in this first example. The shifts of the image height were examined separately in a case wherein the incident light is a parallel light beam and in a case wherein the incident light is a convergent light beam. Also, in each case, the radius of curvature R of the reflecting facets was varied to be ±10000 mm and ±20000 mm. The values given in Table 5 were measured at a field angle of 30°. Further, the difference between the image height in each condition and the image height when the error in the flatness of the reflecting facets is zero (the reflecting facets are flat) is shown in brackets.

TABLE 5

|  | R = −10000 | R = −20000 | flat | R = 20000 | R = 10000 |
| --- | --- | --- | --- | --- | --- |
| parallel light | 119.733 (0.206) | 119.630 (0.103) | 119.527 | 119.424 (−0.103) | 119.322 (−0.205) |
| convergent light | 106.076 (0.185) | 105.983 (0.092) | 105.981 | 105.798 (−0.093) | 105.705 (−0.186) |

Table 6 shows shifts of the image height with changes of the axis-to-facet distance in a case wherein the incident light is a parallel light beam and in a case wherein the incident light is a convergent light beam. A polygonal mirror whose inscribed circle has a diameter of 80 mm (whose designed axis-to-facet distance A is 15 mm) was used, and ±0.1 mm was added to the designed value A as the error Δd. The values given in Table 6 were measured at a field angle of 30°. When a parallel light beam is incident, the image height is not shifted with changes of the axis-to-facet distance (refer to FIG. 5). The convergent light beam which was used had such convergence that the distance between the reflecting point on the polygonal mirror and its image point was +601.92 mm. When the errors Δd in the axis-to-facet distance were ±0.1 mm, the image height was shifted by −0.052 mm and +0.051 mm respectively.

TABLE 6

|  | −0.1 | flat | +0.1 |
| --- | --- | --- | --- |
| parallel light | 119.527 | 119.527 | 119.527 |
| convergent light | 105.942 (0.051) | 105.891 | 105.839 (−0.052) |

Table 7 shows variation of jitter with errors in the flatness of the reflecting facets and errors in the axis-to-facet distance. A polygonal mirror whose inscribed circle has a diameter of 24 mm and whose axis-to facet distance is 12 mm was used. The above-described convergent light beam was used, and an error in the alignment of the reflecting facets from the center of the polygonal mirror was corrected by using the SOS signal. The values given in Table 6 were expressed by ppm (parts per million) and were obtained by measuring values at a specified field angle and by comparing the measured values with a designed value at the field angle.

TABLE 7

| error in axis-to-facet distance | error in flatness of facets ($\lambda$) | | | | | | | | | | |
|---|---|---|---|---|---|---|---|---|---|---|---|
| | 0.5 | 0.4 | 0.3 | 0.2 | 0.1 | 0.0 | −0.1 | −0.2 | −0.3 | −0.4 | −0.5 |
| 0.05 | 116 | 103 | 89 | 75 | 62 | 48 | 35 | 21 | 8 | −6 | −19 |
| 0.04 | 106 | 93 | 79 | 66 | 52 | 39 | 25 | 12 | −2 | −15 | −29 |
| 0.03 | 97 | 83 | 70 | 56 | 43 | 29 | 15 | 2 | −12 | −25 | −39 |
| 0.02 | 87 | 74 | 60 | 46 | 33 | 19 | 6 | −8 | −21 | −35 | −48 |
| 0.01 | 77 | 64 | 50 | 37 | 23 | 10 | −4 | −17 | −31 | −44 | −58 |
| 0.00 | 68 | 54 | 41 | 27 | 14 | 0 | −14 | −27 | −41 | −54 | −68 |
| −0.01 | 58 | 44 | 31 | 17 | 4 | −10 | −23 | −37 | −50 | −64 | −77 |
| −0.02 | 48 | 35 | 21 | 8 | −6 | −19 | −33 | −46 | −60 | −73 | −87 |
| −0.03 | 39 | 25 | 12 | −2 | −15 | −29 | −43 | −56 | −70 | −83 | −97 |
| −0.04 | 29 | 15 | 2 | −12 | −25 | −39 | −52 | −66 | −79 | −93 | −106 |
| −0.05 | 19 | 6 | −8 | −21 | −35 | −48 | −62 | −75 | −89 | −102 | −116 |

The jitter values in Table 7 were calculated in the following way. A scanning time for scanning from an emitting point of the SOS signal to the specified field angle in a case wherein the error in the flatness of the reflecting facets and the error in the axis-to-facet distance are zero is denoted by t. A scanning time for scanning the same area in a case wherein there is an error in at least either the flatness of the reflecting facets or the axis-to-facet distance is denoted by t'. The jitter value is expressed by $\{(t'-t)/t\}\times 10^6$. The larger the value is, the larger the jitter is.

For example, as for a polygonal mirror which has four reflecting facets, when the first and the fourth facets have errors in the flatness and in the axis-to-facet distance as shown in Table 8, the axis-to-facet distances of the first and the fourth facets are adjusted by −0.04 mm and +0.03 mm respectively as shown in Table 9. Thereby, the jitter value is decreased to 4 ppm from 77 ppm. In Tables 8 and 9, the jitter of the polygonal mirror is expressed by the difference between the maximum value and the minimum value of the jitter values of the four facets.

TABLE 8 before adjustment

| | error in flatness ($\lambda$) | error in axis-to-facet distance (mm) | jitter of each between (ppm) | jitter of polygonal mirror (ppm) |
|---|---|---|---|---|
| first facet | +0.3 | +0.01 | 50 | |
| second facet | +0.1 | −0.01 | 4 | 77 |
| third facet | 0 | 0 | 0 | (50 + 27) |
| fourth facet | −0.2 | 0 | −27 | |

TABLE 9 after adjustment

| | error in flatness ($\lambda$) | error in axis-to-facet distance (mm) | jitter of each between (ppm) | jitter of polygonal mirror (ppm) |
|---|---|---|---|---|
| first facet | +0.3 | −0.04 | 1 | |
| second facet | +0.1 | −0.01 | 4 | 4 |
| third facet | 0 | 0 | 0 | (4–0) |
| fourth facet | −0.2 | +0.03 | 2 | |

Second example of the composition

Table 10 shows the second example of the composition of the light beam scanning optical apparatus shown in FIG. 1.

TABLE 10

| | | radius of curvature (mm) | | space (mm) | refractive index |
|---|---|---|---|---|---|
| | | main scanning direction | sub scanning direction | | |
| polygonal mirror | | infinity (reflecting facet) | | 50 | 1.0 |
| fθ optical | toric lens | −65.0 −60.0 | 43.15 | 10 | 1.48457 |
| | sherical mirror | −440 (reflecting facet) | | 60 200 | 1.0 1.0 |
| image surface | | | | | |

Table 11 shows shifts of the image height with errors in the flatness of the reflecting facets of the polygonal mirror in this second example. The shifts of the image height were examined separately in a case wherein the incident light is a parallel light beam and in a case wherein the incident light is a divergent light beam. Also, in each case, the radius of curvature R of the reflecting facets was varied to be ±10000 mm and ±20000 mm. The values given in Table 11 were measured at a field angle of 30°. Further, the difference between the image height in each condition and the image height when the error in the flatness of the reflecting facets is zero (the reflecting facets are flat) is shown in brackets.

TABLE 11

|  | R = −10000 | R = −20000 | flat | R = 20000 | R = 10000 |
|---|---|---|---|---|---|
| parallel light | 142.051 | 141.916 | 141.782 | 141.647 | 141.512 |
|  | (0.269) | (0.134) |  | (−0.135) | (−0.270) |
| convergent light | 148.624 | 148.482 | 148.340 | 148.198 | 148.056 |
|  | (0.284) | (0.142) |  | (−0.142) | (−0.284) |

Table 12 shows shifts of the image height with changes of the axis-to-facet distance in a case wherein the incident light is a parallel light beam and in a case wherein the incident light is a divergent light beam. A polygonal mirror whose inscribed circle has a diameter of 30 mm (whose designed axis-to-facet distance A is 15 mm) was used, and ±0.1 mm was added to the designed value A as the error Δd. The values given in Table 12 were measured at a field angle of 30°. The image height is not shifted with changes of the axis-to-facet distance when a parallel light beam is incident (refer to FIG. 5). The divergent light beam which was used had such divergence that the distance between the reflecting point on the polygonal mirror and its object point was −1392.74 mm. When the errors Δd in the axis-to-facet distance were ±0.1 mm, the image height was shifted by ±0.026 mm respectively.

TABLE 12

|  | −0.1 | flat | +0.1 |
|---|---|---|---|
| parallel light | 141.782 | 141.782 | 141.782 |
| divergent light | 148.314 | 148.340 | 148.366 |
|  | (0.026) |  | (−0.026) |

Table 13 shows variation of jitter with errors in the flatness of the reflecting facets and errors in the axis-to-facet distance. A polygonal mirror whose inscribed circle has a diameter of 24 mm and whose axis-to-facet distance is 12 mm was used. The above-described divergent light beam was used, and an error in the alignment of the reflecting facets from the center of the polygonal mirror was corrected by using the SOS signal. The values given in Table 13 were expressed by ppm (parts per million) and were obtained by measuring values at a specified field angle and by comparing the measured values with a designed value at the field angle.

TABLE 13

| error in axis-to-facet distance | error in flatness of facets (λ) | | | | | | | | | | |
|---|---|---|---|---|---|---|---|---|---|---|---|
|  | 0.5 | 0.4 | 0.3 | 0.2 | 0.1 | 0.0 | −0.1 | −0.2 | −0.3 | −0.4 | −0.5 |
| 0.03 | 40 | 25 | 11 | −4 | −18 | −33 | −48 | −62 | −77 | −91 | −106 |
| 0.04 | 47 | 32 | 17 | 3 | −12 | −26 | −41 | −56 | −70 | −85 | −99 |
| 0.03 | 53 | 39 | 24 | 9 | −5 | −20 | −34 | −49 | −64 | −78 | −93 |
| 0.02 | 60 | 45 | 31 | 16 | 1 | −13 | −28 | −42 | −57 | −72 | −86 |
| 0.01 | 66 | 52 | 37 | 23 | 8 | −7 | −21 | −36 | −50 | −65 | −80 |
| 0.00 | 73 | 58 | 44 | 29 | 15 | 0 | −15 | −29 | −44 | −58 | −73 |
| −0.01 | 80 | 65 | 50 | 36 | 21 | 7 | −8 | −23 | −37 | −52 | −66 |
| −0.02 | 86 | 72 | 57 | 42 | 28 | 13 | −1 | −16 | −31 | −45 | −60 |
| −0.03 | 93 | 78 | 64 | 49 | 34 | 20 | 5 | −9 | −24 | −39 | −53 |
| −0.04 | 99 | 85 | 70 | 56 | 41 | 26 | 12 | −3 | −17 | −32 | −47 |
| −0.05 | 106 | 91 | 77 | 62 | 48 | 33 | 18 | 4 | −11 | −25 | −40 |

The jitter values shown in Table 13 were calculated in the same way as the ones in Table 7.

For example, if a polygonal mirror which has four reflecting facets has errors in the flatness of the reflecting facets and the axis-to-facet distance as shown in Table 14, the axis-to-facet distances of the first, second and fourth facets are adjusted by +0.05, +0.02 mm and −0.05 mm respectively as shown in Table 15. Thereby, the jitter value is decreased from 66 ppm to 11 ppm. In Tables 14 and 15, the jitter of the polygonal mirror is expressed by the difference between the maximum value and the minimum value of the jitter values of the four facets.

TABLE 14

|  | before amendment | | | |
|---|---|---|---|---|
|  | error in flatness (λ) | error in axis-to-facet distance (mm) | jitter of each between (ppm) | jitter of polygonal mirror (ppm) |
| first facet | +0.3 | +0.01 | 37 |  |
| second facet | +0.1 | −0.01 | 21 | 66 (37 + 29) |
| third | 0 | 0 | 0 |  |

TABLE 14-continued

| | before amendment | | | |
|---|---|---|---|---|
| | error in flatness (λ) | error in axis-to-facet distance (mm) | jitter of each between (ppm) | jitter of polygonal mirror (ppm) |
| facet | | | | |
| fourth facet | −0.2 | 0 | −29 | |

TABLE 15

| | after adjustment | | | |
|---|---|---|---|---|
| | error in flatness (λ) | error in axis-to-facet distance (mm) | jitter of each between (ppm) | jitter of polygonal mirror (ppm) |
| first facet | +0.3 | −0.05 | 11 | |
| second facet | +0.1 | +0.02 | 1 | 11 |
| third facet | 0 | 0 | 0 | (11 − 0) |
| fourth facet | −0.2 | −0.05 | 4 | |

Now, a manufacturing method of a polygonal mirror is described.

First, a polyhedron is injection-molded out of resin, and an error in the flatness of each facet of the polyhedron is measured. Then, the distance between the rotation axis and each facet is adjusted according to the measured error. The distance is adjusted practically by adjusting the position of each facet of the mold according to the measured error. After that, a polyhedron is again injection-molded with the remade mold. In another way, not only the flatness of each facet of the first molded polyhedron but also the axis-to-facet distance is measured. Based on the measured errors in the flatness and the axis-to-facet distance of each facet, the jitter of the facet is judged. Then, the axis-to-facet distances are adjusted in order to minimize the differences among the facets in jitter.

Although the present invention has been described in connection with the preferred embodiments above, it is to be noted that various changes and modifications are apparent to a person skilled in the art. Such changes and modifications are to be understood as being within the scope of the present invention.

Particularly, the composition of the fθ optical system is optional, and can be composed by optical elements other than the toric lens and the spherical mirror.

What is claimed is:

1. A light beam scanning optical apparatus, comprising:

a light source; and a polygonal mirror which deflects a light beam emitted from the light source to scan the light beam on a light receiving surface;

wherein the polygonal mirror has reflecting facets which are at such distances from a rotation axis of the polygonal mirror and have such curvatures that a shift of a beam spot position on the light receiving surface caused by differences among the reflecting facets in curvature can be counterbalanced by a shift of the beam spot position caused by differences among the reflecting facets in distance from the rotation axis.

2. A light beam scanning optical apparatus as claimed in claim 1, wherein:

a convergent light beam is incident to the polygonal mirror;

the curvature of each reflecting facet is concave; and the larger the concave curvature of each reflecting facet is, the larger the distance between the reflecting facet and the rotation axis is.

3. A light beam scanning optical apparatus as claimed in claim 1 wherein:

a divergent light beam is incident to the polygonal mirror;

the curvature of each reflecting facet is concave; and the larger the concave curvature of each reflecting facet of the polygonal mirror is, the smaller the distance between reflecting facet and the rotation axis is.

4. A light beam scanning optical apparatus as claimed in claim 1, wherein the polygonal mirror is made of resin.

5. A light beam scanning optical apparatus as claimed in claim 1, wherein a light beam which is reflected by the reflecting facets of the polygonal mirror is imaged on the light receiving surface through an fθ optical system.

\* \* \* \* \*